United States Patent [19]

Smallegan

[11] 4,348,796
[45] Sep. 14, 1982

[54] NUT INSTALLATION APPARATUS AND METHOD

[75] Inventor: Jon M. Smallegan, Farmington Hills, Mich.

[73] Assignee: Multifastener Corporation, Detroit, Mich.

[21] Appl. No.: 118,931

[22] Filed: Feb. 6, 1980

[51] Int. Cl.³ .............................................. B21P 19/04
[52] U.S. Cl. ........................................ 29/432; 29/716; 29/798
[58] Field of Search ....................... 29/432, 432.1, 798, 29/707, 716, 243.5, 243.52, 243.53; 411/179

[56] References Cited

U.S. PATENT DOCUMENTS

| | | | |
|---|---|---|---|
| 2,707,322 | 5/1955 | Strain | 29/432.1 |
| 2,750,660 | 6/1956 | Newcomb | 29/432 |
| 2,799,188 | 7/1957 | Newcomb | 29/432 |
| 3,648,747 | 3/1972 | Steward | 411/179 |
| 3,711,931 | 1/1973 | Ladouceur | 29/432 |
| 3,775,365 | 4/1975 | Beneteau | 60/560 |
| 3,811,171 | 5/1974 | Grube | 29/417 |
| 3,845,860 | 11/1974 | Ladouceur | 29/412 |
| 3,851,373 | 12/1974 | Shinjo | 29/798 |
| 3,921,276 | 11/1975 | Oaks | 29/432 |
| 4,099,436 | 7/1978 | Beneteau | 60/560 |
| 4,124,050 | 11/1978 | Ackerman | 29/432 |
| 4,164,072 | 8/1979 | Shinjo | 29/798 |

Primary Examiner—Gene Crosby
Attorney, Agent, or Firm—Cullen, Sloman, Cantor, Grauer, Scott & Rutherford

[57] ABSTRACT

A nut installation apparatus or head for installing self-attaching nuts, such as pierce nuts, in a panel, without the requirement of a large forming die press assembly. The apparatus includes a nut anchor, which holds the first or end nut stationary, a relatively movable die member, opposite the nut anchor, which supports the panel and a resiliently supported nut guide having a passage receiving nuts in bulk or strip form. The panel is biased into contact with the end nut and nut guide, by the movable die, to install the nut in a panel. Where the nuts are in strip form, the apparatus first severs the end nut from the strip and then attaches the nut in the panel, in a separate step. A unique sensor is provided to assure proper installation.

11 Claims, 8 Drawing Figures

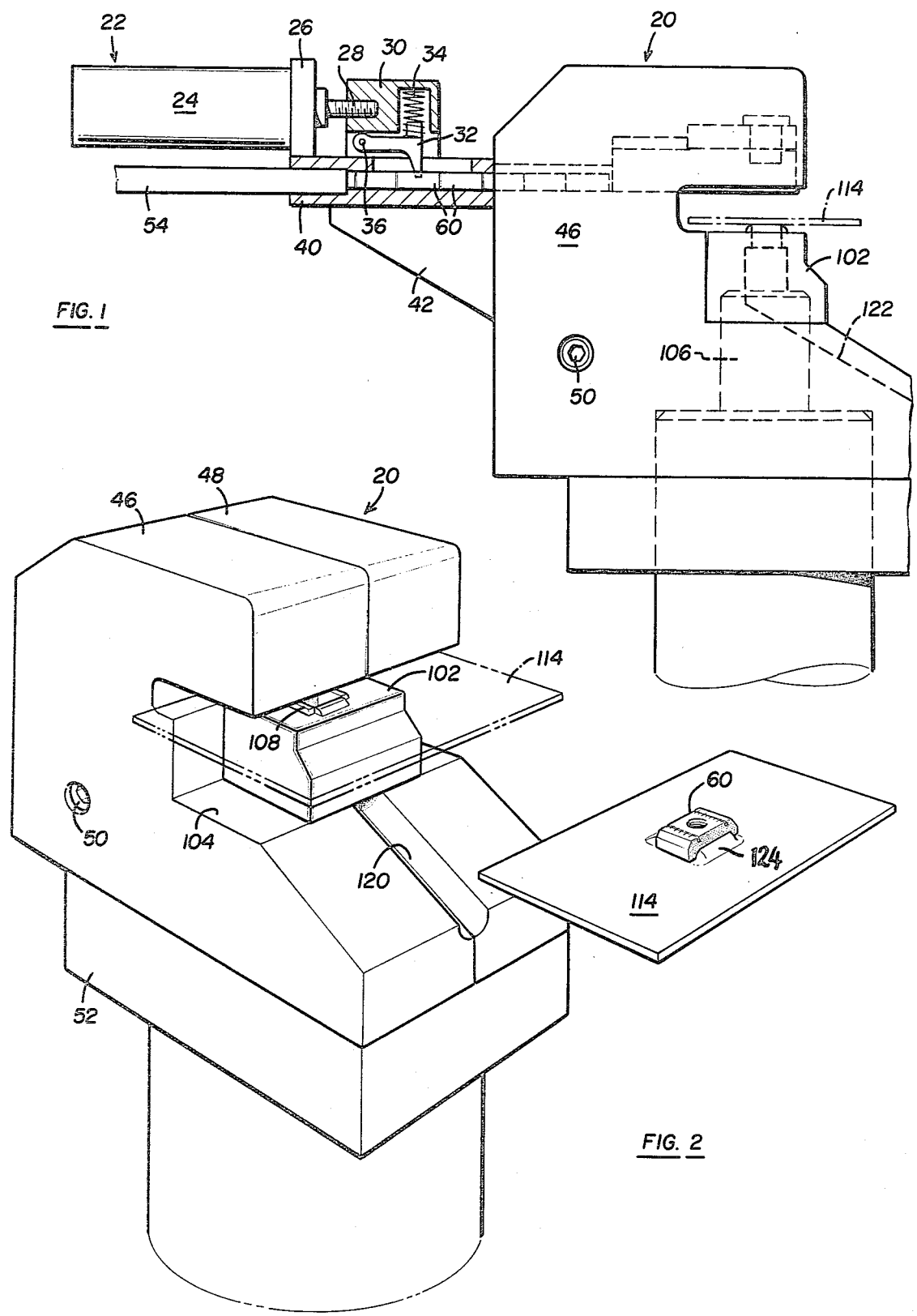

NUT INSTALLATION APPARATUS AND METHOD

FIELD OF THE INVENTION

This invention relates to fastener installation apparatus for installing self-attaching nuts to a panel, such as pierce and clinch nuts. The apparatus may be used to attach nuts in bulk or strip form.

DESCRIPTION OF THE PRIOR ART

Installation heads for pierce and clinch nuts generally include a passage receiving the nuts, a transverse plunger passage having a reciprocating plunger and feed means feeding nuts from the nut passage, beneath the plunger, and installing the nuts in a panel located beneath the plunger. Present installation heads are generally designed to accommodate pierce or clinch nuts in either bulk or strip form. In strip form, adjacent nuts are interconnected by frangible connector means, which may be separate connectors or integral with the nuts.

Pierce nuts generally include and projecting rectangular pilot portion which pierces a hole in the panel. The panel is then deformed into nut grooves adjacent or beneath the pilot as shown in U.S. Pat. Nos. 3,648,747 and 2,707,322, assigned to the assignee of this application. The piercing and installation force is provided by the plunger, which reciprocates within the pierce nut installation head as described above. A die member is provided beneath the plunger opening, which supports the panel, and which deforms the panel into the nut grooves. In a pierce nut installation head, the die includes an opening configured to receive the slug pierced from the panel. The die may also deform the nut to overlie the panel as shown in U.S. Pat. Nos. 2,750,660 and 2,799,188, which patents are assigned to the assignee of the present application.

In commercial pierce and clinch nut applications, the installation heads are located in a panel forming die press, such as used by the automotive industry to form automotive body panels. The nuts are installed with each stroke of the press. The plunger is fixed to one die press member and the die is fixed to the other. Thus, the plunger piercing force is supplied by the die press, which typically generates about twenty to one thousand tons of pressure.

The need, therefore, remains for a simple pierce and clinch nut installation apparatus having its own source of power, which can be used in applications where a large die press is not available. The pierce nut installation apparatus of this invention operates from conventional air line pressure. The apparatus is quiet, reliable and simple in construction and use.

SUMMARY OF THE INVENTION

The pierce nut installation apparatus of this invention is particularly adapted for securing self-attaching nuts, such as pierce or clinch nuts, on a panel. As described above, pierce nuts have a projecting pilot adapted to pierce its own hole in the panel and form a mechanical interlock with the panel, such as disclosed in U.S. Pat. No. 3,648,747, referred to hereinabove. The apparatus of this invention includes a nut guide having a passage for receiving the nuts in strip or bulk form, including a bottom wall supporting the nuts received within the passage. In bulk form, the nuts are received in the nut passage, aligned for installation, with the nut pilots projecting downwardly to pierce the panel. In strip form, the nuts are interconnected by frangible connector means, which may be separate or integral with the nuts.

The end nut is held stationary by a nut anchor located adjacent the end of the nut passage and forming a top wall of the passage. The nut anchor is configured to hold the nut against movement, while permitting the remaining nuts in the passage to move upwardly in the nut guide. A movable die member is located opposite the nut anchor. In the nut installation apparatus of the present invention, the die member is movable under pressure toward the nut anchor and the nut anchor is fixed, which results in unexpected advantages in a nut installation head, as described below. The die supports the panel and moves the panel into engagement with the end nut and the nut guide. The guide includes a window or downwardly facing opening the nut anchor and the die.

A spring means resiliently supports the nut guide for upward movement relative to the nut guide. In the disclosed embodiment, the spring means is provided by a resilient compressible pad, such as polyurethane foam. Where the nuts are received in strip form, including frangible connector means, the initial movement of the nut guide, relative to the end nut, beneath the nut anchor, fractures or cuts the frangible connector means. This movement can be sensed and used to control the final piercing and clinching operations.

In the preferred embodiment of the nut installation head of this invention, the die member is supported by a two stage piston. The first stage, which can be operated by air line pressure alone, moves the die and the supported panel into engagement with the nut located beneath the nut anchor. The contact pressure is preferably sufficient to move the nut guide upwardly relative to the nut anchor and sever the frangible conector means. The panel need not be permanently deformed. As described, this slight movement of the nut guide may be sensed by a hydraulic sensor and switching mechanism which stops the press if the end nut is not properly aligned beneath the nut anchor, such that the nut guide moves upwardly and severs the frangible connector means. The sensor means may also be used where nuts are fed in bulk form, because the nut guide will not move relative to the nut anchor if the end nut is only partially located beneath the nut anchor.

The second piston stage, which may be controlled by the sensor and switching mechanism described, forces the die and panel into deforming engagement with the end nut, locking the nut on the panel. In a typical application, the die includes projecting locking lips which deform the panel into downwardly facing grooves in the pierce nut. A slug, pierced from the panel by the nut pilot, is received through an opening in the die member. In the disclosed embodiment, the second stage of the piston is hydraulically actuated, providing sufficient force to pierce a panel and lock the nut on the panel. The required force will, of course, depend upon the nut configuration and the thickness of the panel. In the preferred embodiment, the second stage of the piston is actuated only if the end nut is properly located beneath the anchor.

The method of attaching self-locking nuts to a panel of this invention thus includes: supporting the panel on a movable die, opposite a stationary nut anchor; disposing a nut between the nut anchor and the panel; and moving the die toward the anchor into engagement with the end nut. Where the nuts are interconnected by frangible connector means in a strip, the end nut is first detached from the strip by holding the end nut and biasing the remaining nuts upwardly, breaking the frangible connector means. Where the nuts are in bulk form, the end in held in place above the opening in the nut guide and the guide is moved upwardly. The nut anchor may be magnetic to hold the end nut in place.

As described, the end nut is permanently secured to the panel, preferably in a separate step. In the preferred method, the initial upward movement of the nut guide is sensed, indicating that a nut is properly located beneath the nut anchor, ready for installation. The panel is only slightly deformed, preferably within its elastic limit, permitting relocation of the panel if the end nut is not ready for installation. If the nut is ready, the second stage of the piston is actuated and the panel is deformed into locking engagement with the end nut. When the method and apparatus of this invention is utilized to install a pierce nut, the nut pilot pierces its own hole in the panel and the die deforms panel portions into locking grooves in the nut.

The method of attaching nuts to a panel and apparatus of this invention is thus simple in construction and use. The installation apparatus includes its own source of power, eliminating the requirement for a large die press, as described above. The apparatus is quiet in operation, particularly compared to a large die press. Further, the disclosed embodiment of the nut installation apparatus of this invention may be operated from a conventional air line available in most manufacturing facilities. Other advantages and meritorious features of the invention will be more fully understood from the following Description of the Preferred Embodiments, the claims and the appended drawings, a brief description of which follows.

BRIEF DESCRIPTION OF THE DRAWINGS

FIG. 1 is a side elevation of one embodiment of the nut installation apparatus of this invention;

FIG. 2 is a side elevation of the nut installation apparatus shown in FIG. 1, with a nut and panel assembly, which may be formed by the disclosed apparatus;

DESCRIPTION OF THE PREFERRED EMBODIMENTS

Figure 3:
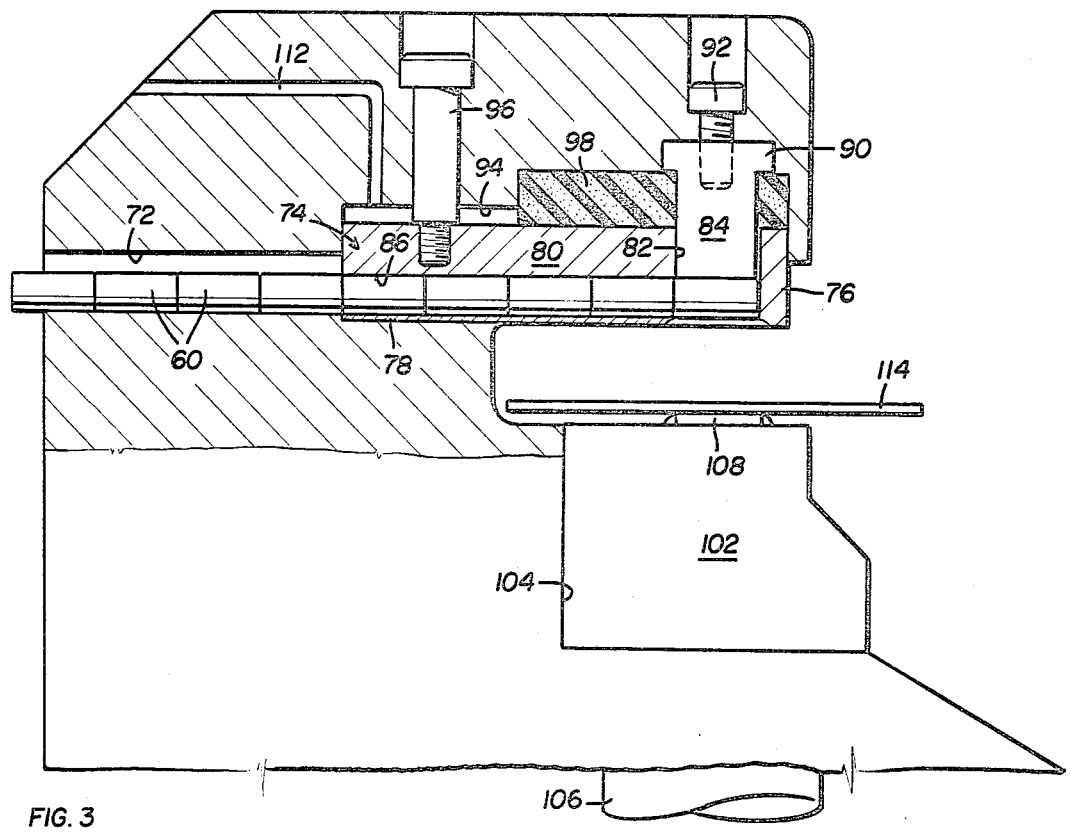
FIG. 3 is a side view, partially cross-sectioned, of the nut installation apparatus shown in FIG. 1, with the die assembly open.

The disclosed embodiment of the nut installation apparatus or head is shown generally at 20 in FIGS. 1 and 2. Pierce or clinch nuts are fed to the head by a conventional feed mechanism or chucker 22. The feed mechanism includes a piston-cylinder 24, which is secured to the housing by clamp 26. The piston may be hydraulically actuated or operate under standard air line pressure. The piston rod 28 is threaded to a feed head 30. The feed head includes a pawl 32, which is pivotally connected to the head at 36, and resiliently biased by spring 34 into a nut bore. Extension of the piston rod 28 thus feeds nuts into the nut passage 40. When the piston rod 28 and feed head 30 is retracted, the pawl 32 is biased into the head 30, out of engagement with the nuts, permitting return of the head for feeding further nuts. The nut channel or passage member 40 is supported on the housing in the disclosed embodiment by brace member 42.

Figure 7:
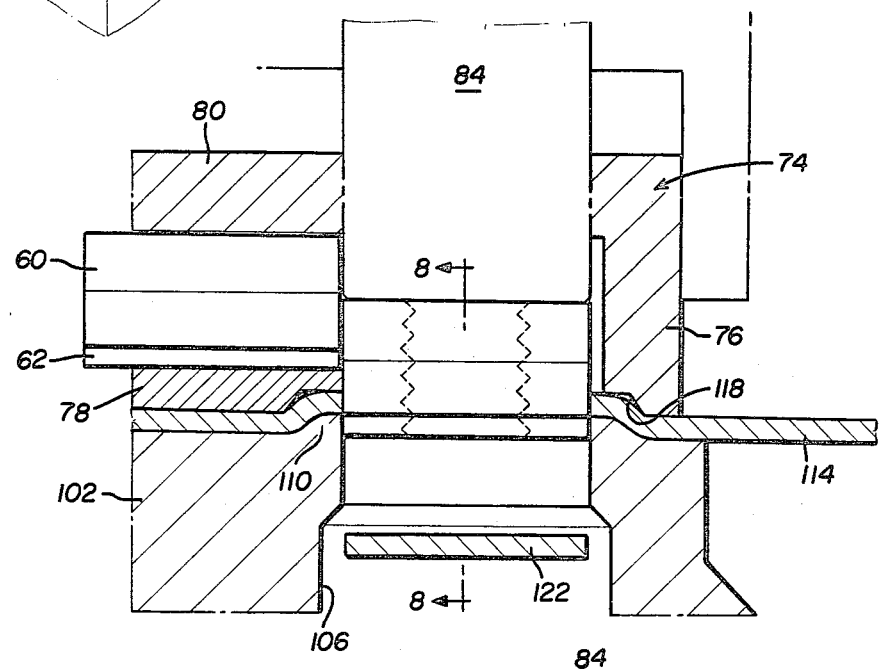
FIG. 7 is an enlarged side cross-sectional view of the nut installation head of FIG. 1, with the nut and panel assembly.
Figure 8:
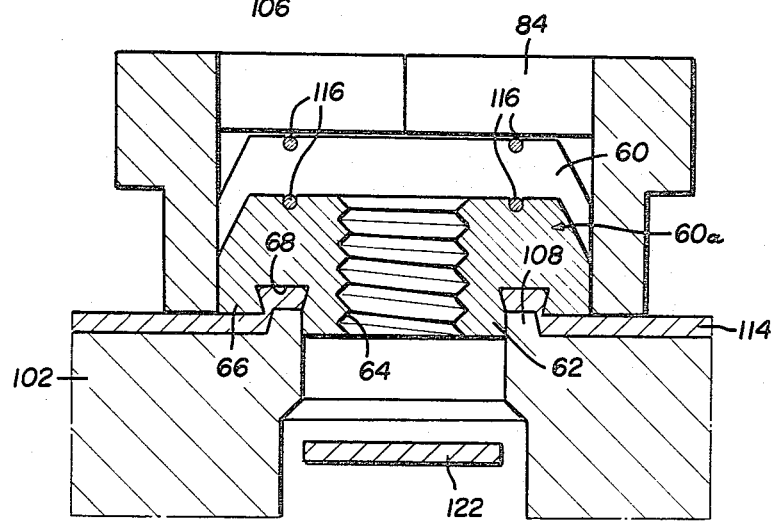
FIG. 8 is a cross-sectional view of FIG. 7, in the direction of view arrows 8/8.

In the disclosed embodiment, the nut installation housing is composed of two C-shaped sections, 46 and 48, secured by bolts 50. The housing sections are secured to a support 52 by bolts or other means, not shown. The nuts 60 are received in the nut passage 40 preferably through conventional plastic chuting 54. As described, the nuts 60 may be received in bulk or strip form. Further, the preferred configuration of the nut will depend upon the specific application. For example, the nuts may be universal pierce nuts, as disclosed in U.S. Pat. No. 2,707,322, in bulk form or interconnected by frangible wires, as disclosed in U.S. Pat. No. 3,711,931. In the disclosed embodiment, the nuts 60 are generally rectangular in cross section, having a rectangular projecting pilot portion 62, as shown in FIGS. 7 and 8, a central threaded bore 64, opposed lateral flange portions 66, and parallel reentrant grooves 68 defined in the flange portions, on opposed sides of the pilot. A more detailed description of the pierce nut shown in FIGS. 7 and 8 may be found in U.S. Pat. No. 3,648,747.

As shown in FIG. 3, the pierce nuts are received within the housing through nut passage 72 into movable nut guide 74. The nut guide includes an end wall 76, a bottom wall 78, a top wall 80 and a transverse passage 82 which receives the nut anchor 84 and provides a window through which the nut is pierced. In the disclosed embodiment, the end portion of the nut anchor 84 is generally rectangular, having the same configuration as the pierce nuts and the transverse rectangular passage 82 in the nut guide. Further, as shown in FIG. 3, the end of the nut anchor 84 forms a top wall of the nut passage 86, preventing upward movement of a nut received beneath the nut anchor during movement of the nut guide.

Figure 4:
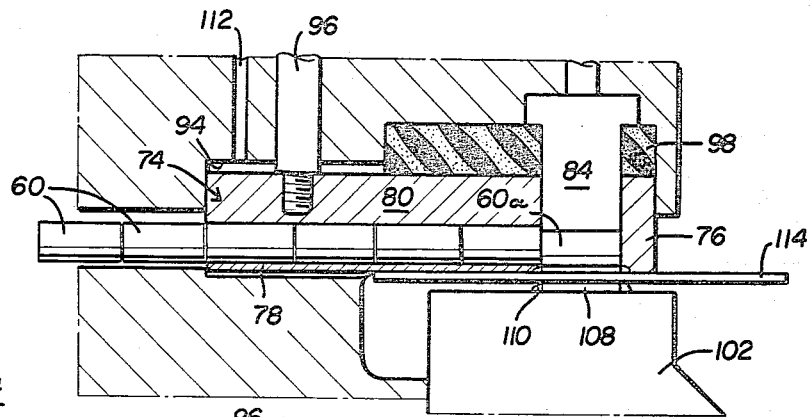
FIG. 4 is a side view of the nut installation head, partially cross-sectioned as shown in FIG. 3, with the die assembly closed.
Figure 5:
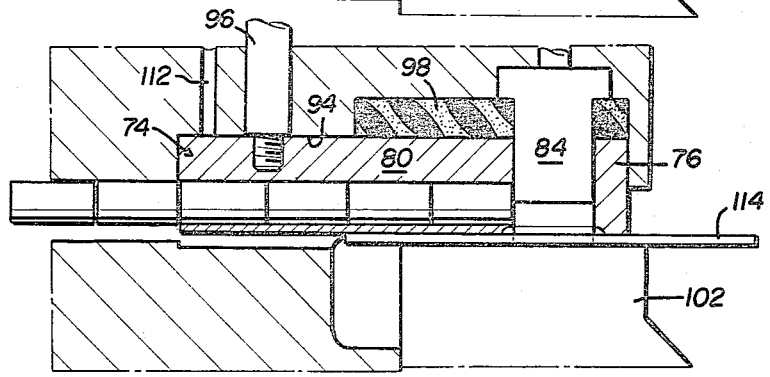
FIG. 5 is a side view of the nut installation head, partially cross-sectioned as shown in FIG. 3, with the die assembly fully seated in the panel, forming the nut and panel assembly shown in FIG. 2.

In the disclosed embodiment, the nut anchor 84 is T-shaped, including a rectangular shoulder portion 90, which is fixed to the housing by bolt 92. The nut guide 74 is received within a rectangular opening 94 in the housing, permitting upward movement of the nut guide. In the disclosed embodiment, a guide bolt 96 retains the nut guide 74 within the opening 94, while permitting upward movement of the nut guide, as shown in FIGS. 4 and 5. A spring means 98 resiliently biases the nut guide downwardly, but permits upward movement, as described above. In the disclosed embodiment, the spring means 98 comprises a resilient, compressible pad, such as a rectangular pad of polyurethane foam. It will be understood, however, that other materials may be used, including a mechaical spring.

Figure 6:
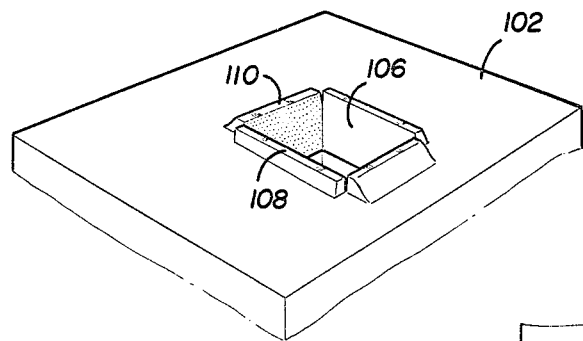
FIG. 6 is a top perspective view of the die shown in FIG. 1.

A movable die member 102 is disposed within the C-shaped opening 104 in the housing as best shown in FIGS. 2 and 3. The die member is supported on a piston 106, as shown in FIGS. 1 and 3. the die member includes a rectangular opening 106, see FIG. 6, and opposed projecting pairs of clinching lips, 108 and 110.

The panel 114, which is to receive a pierce nut 60, is supported on the die member 102, within the C-shaped opening of the head. As described above, the die member 102 and the supported panel 114 are moved upwardly to engage a pierce nut in the installation head, forming the nut and panel assembly of FIG. 2. In the preferred embodiment, the nut and panel assembly are formed in two distinct steps, as now described.

The die member 102 is first closed in FIG. 4 to engage the panel 114 against the first or end nut 60a and the bottom wall 78 of the movable nut guide. The die pressure is preferably limited substantially within the elastic limit of the panel 114. The end nut 60a is held stationary against the panel by the nut anchor 84, flexing the panel on opposed sides of the end nut 60a. This flexure of the panel lifts the nut guide 74 against the resilient pressure of spring means 98, as shown in FIG. 4. As described, the movement of the nut guide is guided in the disclosed embodiment by guide bolt 96. In the disclosed embodiment, hydraulic fluid is located in the space 94 between the nut guide 74 and the housing wall. Upward movement of the nut guide forces hydraulic fluid through port 112, which is connected to a hydraulic sensing and switching mechanism, not shown. If a nut is only partially located beneath nut anchor 84, the nut guide 74 will not be lifted as shown in FIG. 4, and the piston will not be actuated to form the nut and panel assembly described hereinbelow.

A two stage piston assembly suitable for the nut installation head of this invention is disclosed in United States Patent Nos. 3,875,365 and 4,099,436, the disclosures of such patents are incorporated herein by reference. As described therein, the piston may be operated from a conventional air line, normally available at 60 to 100 psi. The first stage merely extends the piston under the air line pressure. In the disclosed embodiment, the cylinder is approximately three and a half inches in diameter, creating a die pressure of about 500 to 800 psi. This pressure is sufficient to close the die and flex the panel 114 to raise the nut guide 74, as shown in FIG. 4 and described above. The second stage of the piston is hydraulically augmented, as disclosed in the above-referenced patents, creating a die pressure of about 4 to 8 tons. This force is sufficient to form the nut and panel assembly described hereinbelow.

Where the nuts are interconnected by frangible connector means, the initial movement of the nut guide 74, as shown in FIG. 4, breaks the frangible connector means 116 to the end nut 60a, as now described. As described above, the nuts, installed by the nut installation apparatus of this invention, may be in bulk or strip form. The connector means may be integral with the nut or separate connector means may be provided, as shown. In the disclosed embodiment, the nuts are interconnected by frangible wires 116. The method of forming a strip of pierce nuts using frangible wire connectors is disclosed in U.S. Pat. Nos. 3,711,931 and 3,845,860, assigned to the assignee of the instant application. It will be understood that the wires interconnecting the nuts will initially hold the end nut 60a over the opening 82 in the nut guide. When the wires are severed, the end nut is support by the panel 114, as shown in FIG. 4. Where the nuts are in bulk form, the nut anchor 84 may be magnetic to hold the end nut during the installation operation. Alternatively, supporting guide rails may be provided as disclosed in the above patents.

If the end nut 60a properly located beneath the nut anchor 84, the sensing circuit will be actuated by the pressure in line 112 to actuate the second stage of the piston 106. As described above, the actuation of the second stage will increase the die pressure approximately ten-fold, piercing and deforming the panel as now described in regard to FIGS. 5 to 8. The pilot 62 of the nut pierces the panel 114 and is then received in the opening 106 in the die member 102, within the clinching lips 108 and 110. A slug 122 is thus pierced from the panel, as shown in FIGS. 7 and 8, which is received through the die opening 106, and out through slug channel 120, as shown in FIGS. 1 and 2. The panel is then deformed into the reentrant grooves 68 of the nut by clinching lips 108. The opposed clinching lips 110 provide a further mechanical interlock as shown in FIG. 2 and described in the above-referenced U.S. Pat. No. 3,648,747. It will be understood, however, that the nut installation apparatus of this invention may also be used to install other nut configurations including universal pierce nuts, as disclosed in U.S. Pat. No. 2,707,322.

The final movement of the die 102 fully seats the movable nut guide 74 in the rectangular opening 94 in the housing, as shown in FIG. 5. Recesses 118 are provided in the nut guide to receive the clinching lips 110, as shown in FIG. 7. The movement of the nut guide may be continuously monitored, through hydraulic line 112, to avoid damage to the head. If the pressure exceeds a predetermined maximum, the movement of the piston is stopped. When the cycle is complete, the die is opened and the nut and panel assembly removed, as shown in FIG. 2. The opening of the die actuates the feed mechanism 22, extending the piston rod 28 and feeding another pierce nut beneath the nut anchor 84. The pierce nut installation head is then ready to install another nut. The nut guide 74 is returned to the position of FIG. 3 by the resilient pad 98.

The method of attaching nuts to a panel should be apparent from the above description of the nut installation apparatus. Briefly, themethod includes supporting a panel 114 on a die member 102, opposite the first or end nut 60a. The end nut is located beneath the nut anchor 84, opposite the panel, as shown in FIG. 3. Where the nuts are received in a strip form, interconnected by frangible connectors 116, the end nut is removed from the strip by biasing the panel 114 agains the end nut, lifting the remaining nuts, as shown in FIG. 4. The connectors are cut by the rectangular edge of the nut anchor 84. Continued upward movement of the die 102 pierces the panel with the end nut 60a and deforms the panel into locking engagement with the nut, as shown in FIGS. 5, 7 and 8. In the preferred method of this invention, the initial upward movement of the nut guide is sensed through hydraulic line 112, which actuates the final upward movement of the die member, only if a nut 60a is properly seated beneath the nut anchor 84.

The components of the nut installation apparatus of this invention may be formed from conventional steel, such as SAE 6150, including the nut guide 74, the nut anchor 84 and the die member 102. As described above, the resilient pad 98 is preferably formed of a resilient compressible material, such as polyurethane foam. The disclosed embodiment of the nut installation head will install a nut in any suitable panel, including low carbon steel having a thickness of 0.020 to 0.140 inches using the disclosed nut. The nut is preferably formed of a tough resilient steel. Obviously, the panel may also be formed of softer materials, including aluminum, plastic materials, etc. As described above, the installation is relatively quiet, fast and simple. Further, it will be understood by those skilled in the at that various modifications may be made to the installation apparatus and method of this invention. For example, a single stroke piston may be utilized which, however, eliminates some of the unexpected advantages described above. Further, various pierce and clinch nut configurations may be utilized, without modification of the installation apparatus. The sensing circuit may be eliminated, wherein the first and second stage of the piston is separately actuated, which may be accomplished manually. Having thus described the method and apparatus of this invention, I now claim the invention, as follows:

I claim:

1. A method of attaching nuts to a panel, said nuts interconnected by frangible connector means in serial alignment to form a strip of nuts, the method comprising the steps of:
   (a) supporting said panel on a support means opposite the end nut of said strip,
   (b) removing the end nut of said strip of nuts by breaking said frangible connector means, and
   (c) attaching said end nut to said panel by moving said panel into locking engagement with said end nut while moving the remaining nuts of said strip away from the engagement of the end nut with said panel.

2. The method of attaching nuts to a panel defined in claim 1, characterized in that said panel support means comprises a die member having means adapted to deform said panel into locking engagement with said end nut, the method including moving said die member and the supported panel panel into engagement with said end nut and deforming said panel into locking engagement with said nut.

3. The method defined in claim 1, wherein said end nut is removed from said nut strip by holding said end nut stationary, and relatively moving said panel and nut strip.

4. The method defined in claim 3, wherein said panel support means is moved toward said nut strip to bias said panel into engagement with said nut strip and break said frangible connector means; then, in a separate step, deforming said panel into locking engagement with said stationary end nut.

5. The method defined in claim 4, characterized in that said nut strip is resiliently supported by a spring means adapted to permit resilient movement of said nut strip relative to said stationary end nut upon engagement by said panel.

6. A method of attaching self-locking nuts to a panel, said nuts having a projecting pilot adapted to pierce the panel and mechanically interlock with said panel, the method comprising the following steps:
   (a) supporting said panel on a movable die opposite a stationary nut anchor,
   (b) the end nut of a nut strip interconnected by frangible connector means to a serially aligned strip of nuts between said nut anchor and said panel with said nut pilot projecting toward said panel, and
   (c) moving said die member toward said nut anchor and said panel into engagement with said end nut, thereby moving said panel into engagement with saidnut strip and severing the frangible connector means to said end nut, then continuing to move said die and the supported panel into locking engagement with said end nut, said pilot piercing said panel and locking said nut on said panel.

7. The method of attaching self-locking nuts to a panel defined in claim 6 wherein said nut strip being received within a movable nut guide in a housing, means for resiliently biasing said nut guide in a first direction, the movement of said die member toward said nut anchor causing said nut guide to move relative to said end nut in a second direction, and said nut guide acting upon a fluid reservoir within said housing during its movement in said second direction.

8. The method of attaching a nut to a panel defined in claim 7, wherein the contact pressure between said panel and said end nut is initially limited to the elastic limit of said panel until said end nut is severed from said strip; then increasing said contact pressure to pierce said panel with said end nut and lock said end nut on said panel.

9. An apparatus for securing self-attaching nuts on a panel, said nuts having a projecting pilot means adapted to form a mechanical interlock with said panel, said apparatus comprising: a nut guide having a passage for receiving nuts, including a bottom wall supporting the nuts received within said passage, a stationary nut anchor located adjacent the end of said nut passage, said nut anchor having an end portion forming a top wall of said nut passage, said anchor end portion configured to hold a nut against movement, a relatively movable die opposite said nut anchor end portion adapted to support a panel for movement into locking engagement with a nut located between said stationary nut anchor end portion and said panel, and a spring means resiliently supporting said nut guide adapted to permit limited upward resilient movement of said nut guide, relative to said nut anchor.

10. The apparatus for securing nuts on a panel defined in claim 9, characterized in that said nuts are received in said nut passage in a strip of nuts interconnectd by frangible connector means, said die supported by an actuator means, said actuator means adapted to move said die toward said nut anchor to bias said panel into engagement with the end nut of said strip and said nut guide, said panel moving said nut guide relative to said end nut and severing said end nut from said strip, said actuator means increasing the pressure of engagement of said panel and said end nut to deform said panel into locking engagement with said end nut.

11. The apparatus defined in claim 10, said nut guide being movable within a housing, and said nut guide acting upon a fluid reservoir within said housing in response to said panel moving said nut guide relative to said end nut.

* * * * *